O. ANTONELLI.
MOTION PICTURE APPARATUS.
APPLICATION FILED MAR. 15, 1921.

1,406,808.

Patented Feb. 14, 1922.

WITNESSES

INVENTOR
O. ANTONELLI
BY
ATTORNEYS

O. ANTONELLI.
MOTION PICTURE APPARATUS.
APPLICATION FILED MAR. 15, 1921.
1,406,808.
Patented Feb. 14, 1922.
3 SHEETS—SHEET 2.
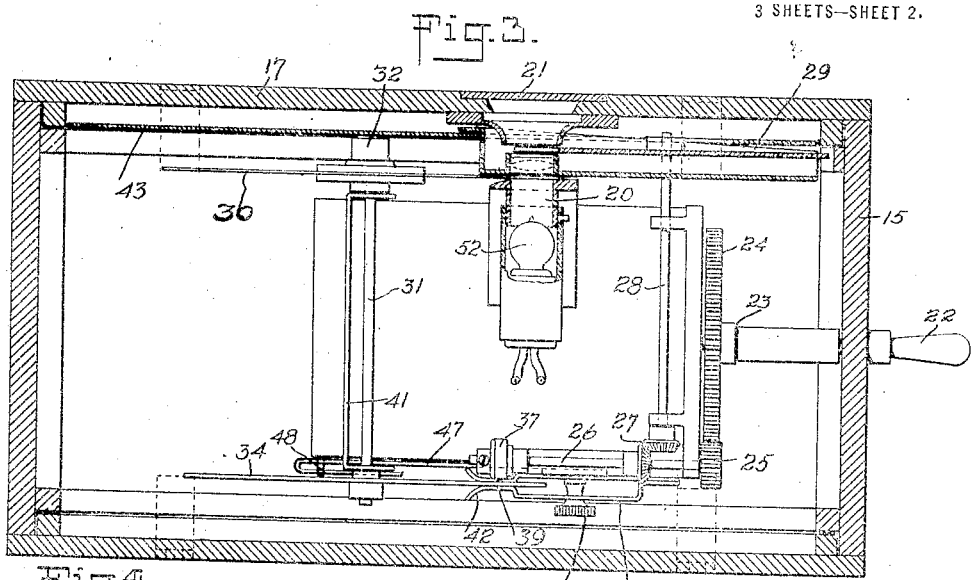
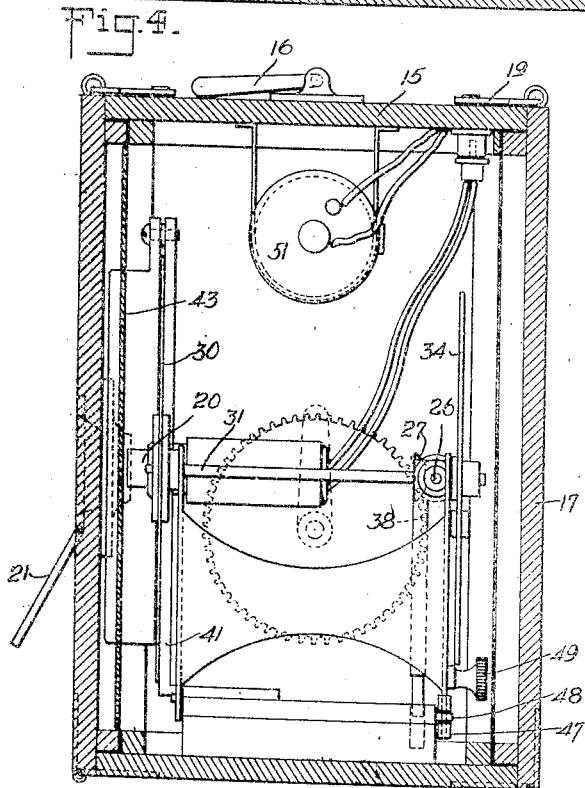
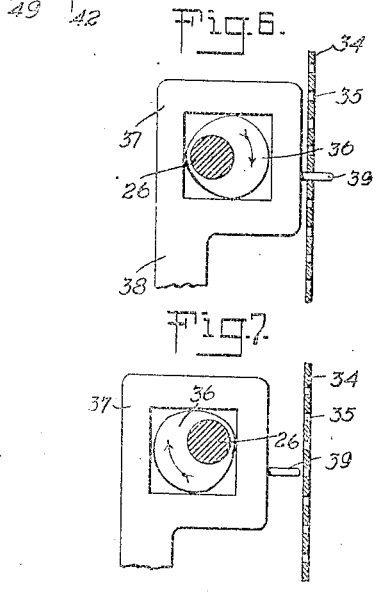
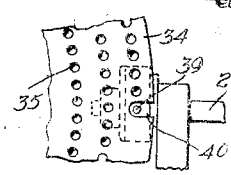
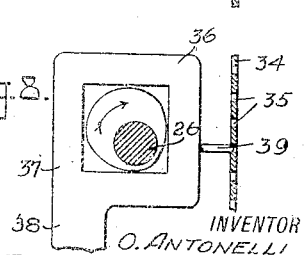
WITNESSES
INVENTOR
O. ANTONELLI
ATTORNEYS

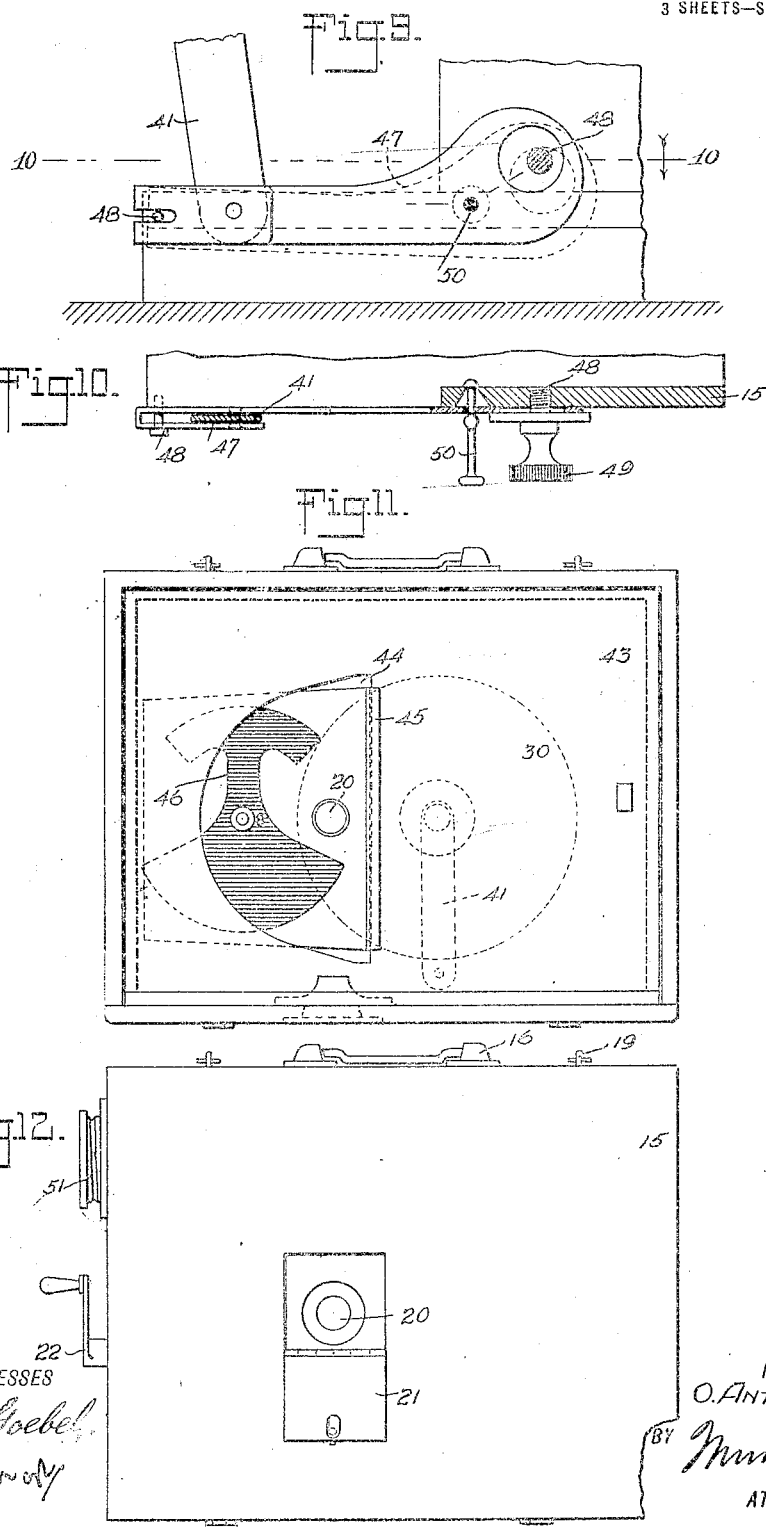

UNITED STATES PATENT OFFICE.

ORAZIO ANTONELLI, OF BROOKLYN, NEW YORK.

MOTION-PICTURE APPARATUS.

1,406,808.

Specification of Letters Patent. Patented Feb. 14, 1922.

Application filed March 15, 1921. Serial No. 452,434.

*To all whom it may concern:*

Be it known that I, ORAZIO ANTONELLI, a subject of the King of Italy, and resident of the city of New York, borough of Brooklyn, in the county of Kings and State of New York, have invented a new and Improved Motion-Picture Apparatus, of which the following is a full, clear, and exact description.

My invention relates to a motion picture apparatus, and aims to provide a device of this character in which one unit shall be capable of taking as well as projecting motion pictures.

With this in view, I have constructed a motion picture apparatus which will primarily permit of the utilization of a film which shall be of a construction permitting of its being manufactured and developed for a nominal amount.

A further object of my invention is the construction of a device of the character specified in which the apparatus permitting of the taking of motion pictures is extremely simple.

Still another object of my invention is the provision of a projecting machine which shall also be simple in construction and be capable of being manufactured for a nominal figure.

Still another object of my invention is that of combining into a single unit both the camera and projecting apparatus aforementioned so that the essential parts of this unit will function for the purposes of both photography and projection, and thus reduce both the initial cost as well as subsequent expense to a minimum.

Further objects of my invention will appear in the annexed specification taken in connection with the drawings, which latter present one practical embodiment of the same, and in which;

Figure 3 is a sectional plan view taken along the lines 3—3 and in the direction of the arrows indicated in Figure 1.

Figure 4 is a sectional end view of the apparatus.

Figures 5, 6, 7 and 8 are enlarged partly fragmentary views showing the different positions of the feeding apparatus.

Figure 9 is an enlarged fragmentary rear view of the carriage adjustment.

Figure 10 is a sectional plan view taken along the line 10—10 and in the direction of the arrows indicated in Fig. 9.

Figure 11 is a face view of the apparatus showing one portion of the case removed, and the elements in the position which they assume upon the same being utilized, as a camera, and Figure 12 illustrates the normal appearance of the exterior of the case.

Figure 1:
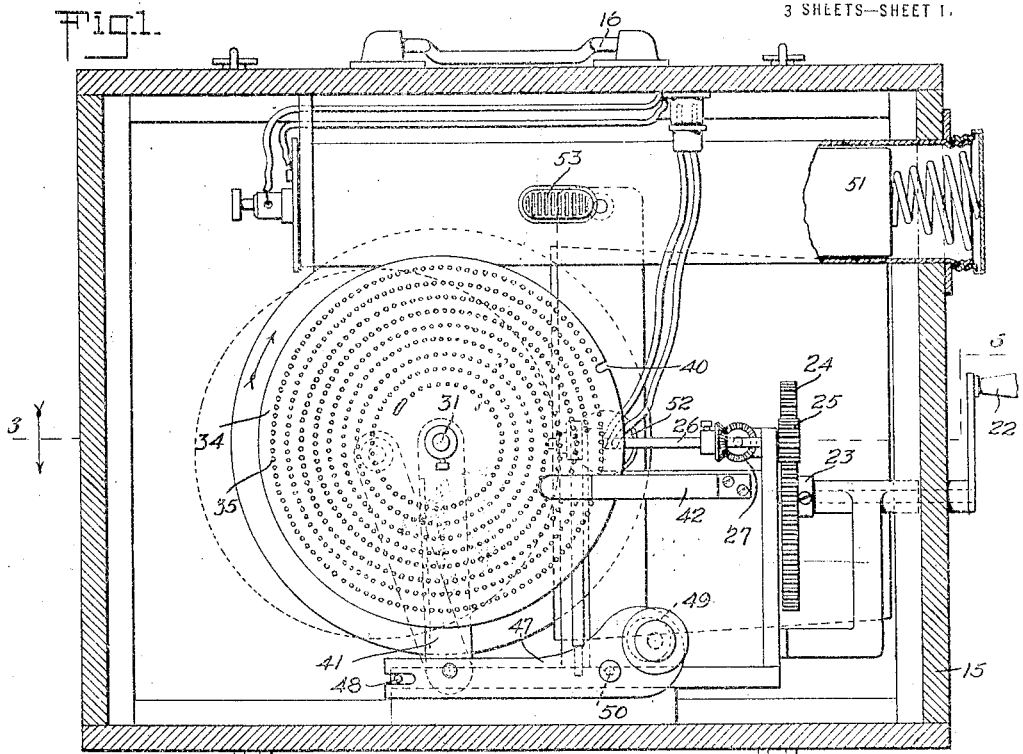
Figure 1 is a sectional view taken through a motion picture apparatus produced in accordance with my invention.

In these views, the reference numeral 15 indicates a casing of any desirable type, which may be provided with a handle 16 permitting of its being carried. Also the side walls 17 of the casing may be hingedly secured as at 18 to the body of the same, and normally retained in their proper position by any suitable fastening means 19.

Now with a view of providing means serving to permit of pictures being taken, I mount a lens 20 within the casing, the passage of exterior light rays through this lens being normally prevented by any suitable form of closure 21.

A crank 22 extending beyond the outer face of the casing 15 serves to permit of a rotation of a shaft 23 within the body of the same, and secured to this shaft is any desired type of gear 24, which co-operating with the gear 25 secured to the rotatably mounted shaft 26, serves to effect a multiplication of movement of the latter.

A pair of beveled gears 27 secured to the shaft 26 and a shaft 28 respectively, serve to transmit rotation from the former to the latter, and a shutter 29 is fixedly secured to the outer end of this shaft 28, and has the outer edge of its body overlying the lens 20 serving in the usual manner to interrupt the passage of light rays through the same.

Thus upon the crank 22 being rotated it will be seen that both the shafts 26 and 28 will rotate, and that the passage of light rays either from the exterior into the interior of the casing, or vice versa, will be interrupted by means of the shutter 29.

To now provide a film and feeding apparatus therefore, it will be noted, reference being had to Figures 1 to 4, that I utilize a sensitized sheet of material 30, in the nature of a disk, said sheet of material being removably clamped in position upon the outer end of a rotatably mounted secondary shaft 31, by any suitable means, such as a screw cap 32, and a guide pin 33.

Secured to the rear end of the shaft 31, is a disk 34 corresponding to the sensitized element 30, it being noted, however, that the disk 34 is formed with a series of perforations 35, constituting in aggregate a spiral line for a purpose hereinafter more fully specified.

It will also be seen that the shaft 26 terminates in a cam 36, which is enveloped by a frame 37, suitably guided and retained in applied position by any suitable means such as arms 38, and which frame 37 carries a pin 39 of a size permitting of its freely entering the perforations 35 of the disk 34.

Thus upon the disk 34 being manipulated to permit of the pin 39 being disposed within the notch 40, arranged in advance of the outermost perforation 35, that a rotation of the shaft 26 will result, as has been indicated in Figures 6 to 8, and the frame 37 moving downwardly, outwardly, upwardly, inwardly and again downwardly.

Thus by virtue of the fact that the pin 39 constitutes a fixed element with respect to the frame 37, it will be seen that the disk 34 will be intermittently moved downwardly during the time that the pin 39 engages the same, as in Figure 6, but that the disk will remain stationary, during that interval in which the frame carrying the pin will move outwardly, upwardly and inwardly.

Figure 2:
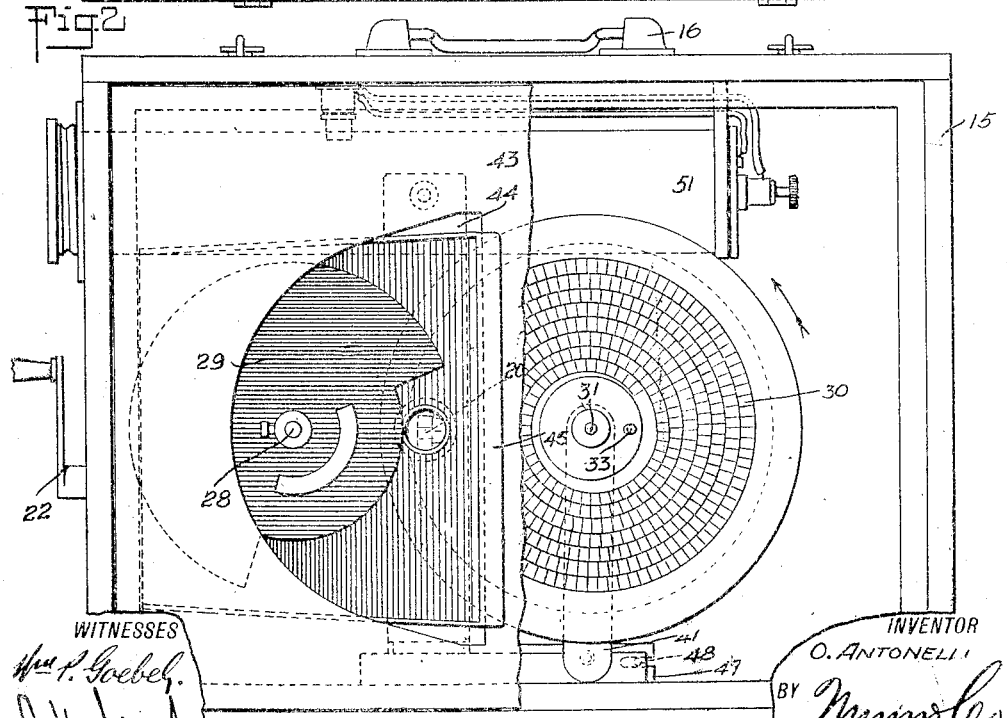
Figure 2 is a front view thereof.

This operation will obviously feed the sensitized element 30 constituting the film properly, and assuming that the carriage 41 rotatably supporting the shaft 31 is swung to a position at which the sensitized element will lie, in the manner shown in Figures 2 and 3, it will be seen that a rotation of the crank 22, subsequent to the opening of the closure 21 will permit of photographs being taken. Also, subsequent photographs will obviously correspond to the manner in which the film is fed, i. e., the motion transmitted to the shaft 31 by means of the disk 34 thus due to the fact that the disk is both rotated and moved towards the center, it will be seen that the photographs are arranged in a spiral line, extending from the periphery of the sensitized element 30, to a point adjacent its center of revolution.

It will also be noted, that it might be highly desirable to provide a guiding means, which will serve to steady the operation of the shaft 31, and with a view of providing this means, I may conveniently utilize a pair of spring guide fingers 42, which will frictionally engage the disk 34 so as to prevent any vibration of the same upon its being moved by the pin 39. Also, with a view of providing means serving to protect the sensitized element 30 from the action of light rays, I may conveniently utilize an opaque plate 43, which will overlie all of the operating mechanism, with the exception of a portion of the shutter 29, and the lens opening, at which point it may be formed with a cutout portion 44, and be retained by means of the guide flange 45.

Assuming that a film has been taken in the manner aforedescribed, and that the same has subsequently been developed and a positive made, and that it is desired to project the results upon a screen, it will be noted that essentially the same apparatus may be employed for projection, as is utilized in taking pictures. However, for this purpose, I detach the shutter 29 and substitute a shutter 46, as well as changing the lens 20. Also, in projection, the plate constituting the screen 43 may be removed so that the work of the operator may be as unobstructed as is possible, and air may circulate through the apparatus with a maximum of freedom.

It will be recognized by those conversant with the art, that it would rarely be possible for an operator to be capable of moving the carriage 41 and the sensitized element 30 to a position at which the photographs upon the latter would properly align with the shutter opening, and to provide an adjustment capable of overcoming this difficulty, it will be noted, reference being had to, Figure 9, that the carriage 41 is movably supported by a bracket 47, the latter being limited in motion by means of guide pins 48, one of which has a lock nut 49 disposed upon its body so that upon this nut being tightened, the bracket 47 is retained in any desired position.

Obviously the images appearing upon the positive will be rather minute, and thus the hand of the average operator is not steady enough to secure that nicety of adjustment of the carriage 41 which is requisite for the proper projection of the images upon the positive, and with this in view, I may employ any suitable means, such as a lever 50, which has one of its ends secured to a fixed portion of the apparatus, and movably engages the bracket 47. Thus the outer end of the lever 50 may be swung to properly position the film, the nut 49 having been previously loosened. A large amount of movement on the part of the outer end of the lever 50 will be transmitted to the bracket 47, to only a small extent, and this will obviously overcome the difficulty aforementioned, as the lever 50 may be held in the position desired, subsequent to which the nut 49 may be tightened to secure the carriage 41 in a proper plane.

A source of electrical energy 51 is positioned within the casing 15, and serves to energize a bulb 52 positioned to the rear of the lens 20, so that upon it being desired to project pictures, the switch 53 may be actuated to cause the bulb 52 to glow, thus producing light rays penetrating through the positive lens and cutout portions of the shutter, and projecting the image upon the screen.

From the foregoing it will be appreciated that I have provided a motion picture apparatus, which will be suitable for use by the average amateur and which may be enjoyed by the entire household, in that the same essential apparatus may be employed for both the making and projection of films which latter, due to their simple construction are extremely economical, it being also noted that it may be placed upon the market at a reduced figure.

Obviously numerous modifications of structure might readily be resorted to without in the least departing from the spirit of my invention, which I claim as:—

1. A motion picture apparatus, including a rotatable shaft, a film adapted to be removably secured to one end of said shaft, a disk secured to the opposite end of said shaft, and means for intermittently rotating and swinging said disk.

2. A motion picture apparatus, including a rotatable shaft, a carriage mounting said shaft, said carriage being capable of a swinging motion, and a movable bracket for mounting said carriage.

3. A motion picture apparatus, including a rotatable shaft, a carriage mounting said shaft, said carriage being capable of a swinging motion, and a bracket for mounting said carriage, and means for moving said bracket.

4. A motion picture apparatus, including a rotatable shaft, a carriage mounting said shaft, said carriage being capable of a swinging motion, and a bracket for mounting said carriage, and means for manually moving said bracket.

5. A motion picture apparatus, including a rotatable shaft, a carriage mounting said shaft, said carriage being capable of a swinging motion, a bracket for mounting said carriage, means for manually moving said bracket, and means for securing said bracket in position.

6. A motion picture apparatus including a shaft, means for rotating said shaft, a cam carried by said shaft, a frame encircling said cam and adapted to be moved thereby upon a rotation of said shaft being effected, a pin carried by said frame, a secondary shaft, a film secured to one end of said latter shaft, a disk formed with a series of perforations secured to the opposite end thereof, a rocking carriage for rotatably mounting said latter shaft, said perforations being arranged in the form of a spiral, said pin being adapted to engage the side walls of said perforations whereby upon a rotation of said first named shaft to effect a rotation and swinging of said last named shaft.

7. A motion picture apparatus, including a shaft, means for rotating said shaft, a secondary shaft, a film carried by one end of said secondary shaft, means secured to the opposite end of said secondary shaft and cooperating with said first named shaft to transmit movement therefrom to said secondary shaft, a lens adapted to align with a certain portion of said film, a third shaft, a shutter carried by said third shaft, means for driving said third shaft from said first named shaft, and a source of illumination adapted to be positioned to the rear of said lens.

ORAZIO ANTONELLI.